US012607156B1

(12) United States Patent
Payne

(10) Patent No.: US 12,607,156 B1
(45) Date of Patent: Apr. 21, 2026

(54) ENGINE DECK EXTENDER

(71) Applicant: P2P SERVICES, LLC, Granbury, TX (US)

(72) Inventor: Ryan Payne, Granbury, TX (US)

(73) Assignee: P2P SERVICES, LLC, Granbury, TX (US)

( * ) Notice: Subject to any disclaimer, the term of this patent is extended or adjusted under 35 U.S.C. 154(b) by 0 days.

(21) Appl. No.: 19/204,286

(22) Filed: May 9, 2025

(51) Int. Cl.
*F02F 1/00* (2006.01)
*F02F 1/10* (2006.01)
*F02F 1/18* (2006.01)

(52) U.S. Cl.
CPC ................ *F02F 1/18* (2013.01); *F02F 1/004* (2013.01); *F02F 1/102* (2013.01)

(58) Field of Classification Search
CPC .... F02F 1/18; F02F 1/004; F02F 1/102; F02F 1/00; F02F 1/002; F02F 1/186; F02F 1/20; F02F 7/0085; F02F 11/005; F02F 2200/00; F02F 2200/06; B22D 19/0009; B22D 15/02; F16J 10/00; F16J 10/04
See application file for complete search history.

(56) References Cited

U.S. PATENT DOCUMENTS

| | | | | |
|---|---|---|---|---|
| 4,917,062 | A * | 4/1990 | Tapper | F02F 1/004 123/193.3 |
| 10,718,291 | B2 * | 7/2020 | Burns | F02F 1/10 |
| 11,378,036 | B2 * | 7/2022 | Craft | F02F 11/002 |
| 11,867,290 | B2 * | 1/2024 | Sadowski | F16J 15/06 |
| 12,013,035 | B2 * | 6/2024 | Contreras | F02F 11/002 |
| 2017/0152810 | A1 * | 6/2017 | Wicks | F02F 1/14 |
| 2019/0323448 | A1 * | 10/2019 | Yang | B22D 19/0009 |
| 2021/0095613 | A1 * | 4/2021 | Kim | F02F 1/004 |
| 2022/0106924 | A1 * | 4/2022 | Craft | F02F 1/14 |

* cited by examiner

*Primary Examiner* — Dapinder Singh
(74) *Attorney, Agent, or Firm* — Chamberlain, Hrdlicka, White, Williams & Aughtry P.C.; Aly Z. Dossa

(57) ABSTRACT

An engine includes a block that includes a block cylinder, a block passage configured to receive a head bolt, and a block fluid passage. The engine also includes a deck extender coupled to the block, and the deck extender includes a deck cylinder configured to align with the block cylinder, a deck passage configured to align with the block passage, and a deck fluid passage configured to align with the block fluid passage. The engine further includes a cylinder liner coupled to the block and the deck extender via the block cylinder and the deck cylinder, and the cylinder liner includes a contiguous cylinder wall to form an engine cylinder. Moreover, the engine includes a cylinder head configured to couple to the deck extender.

20 Claims, 8 Drawing Sheets

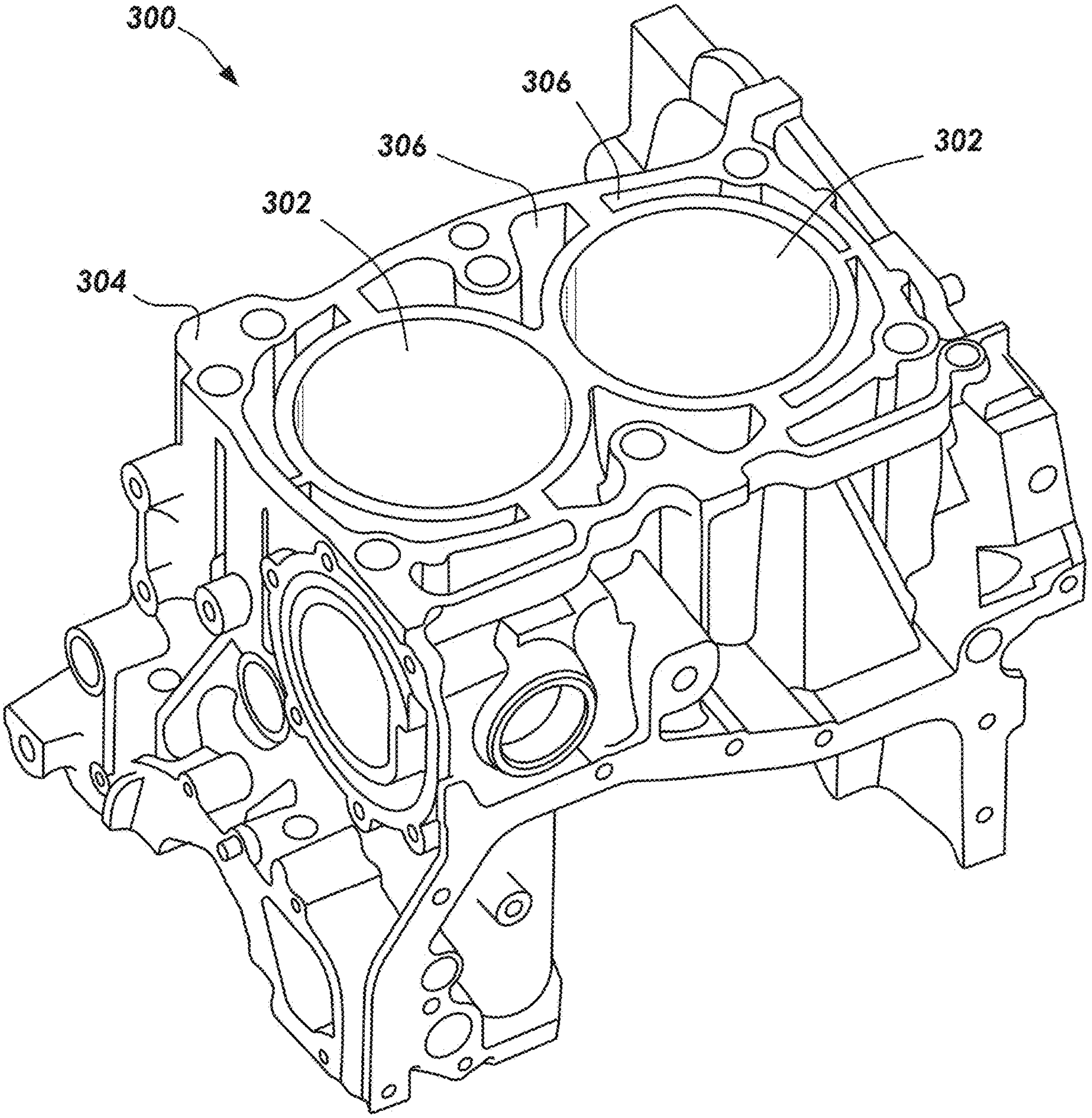
FIG. 3.1

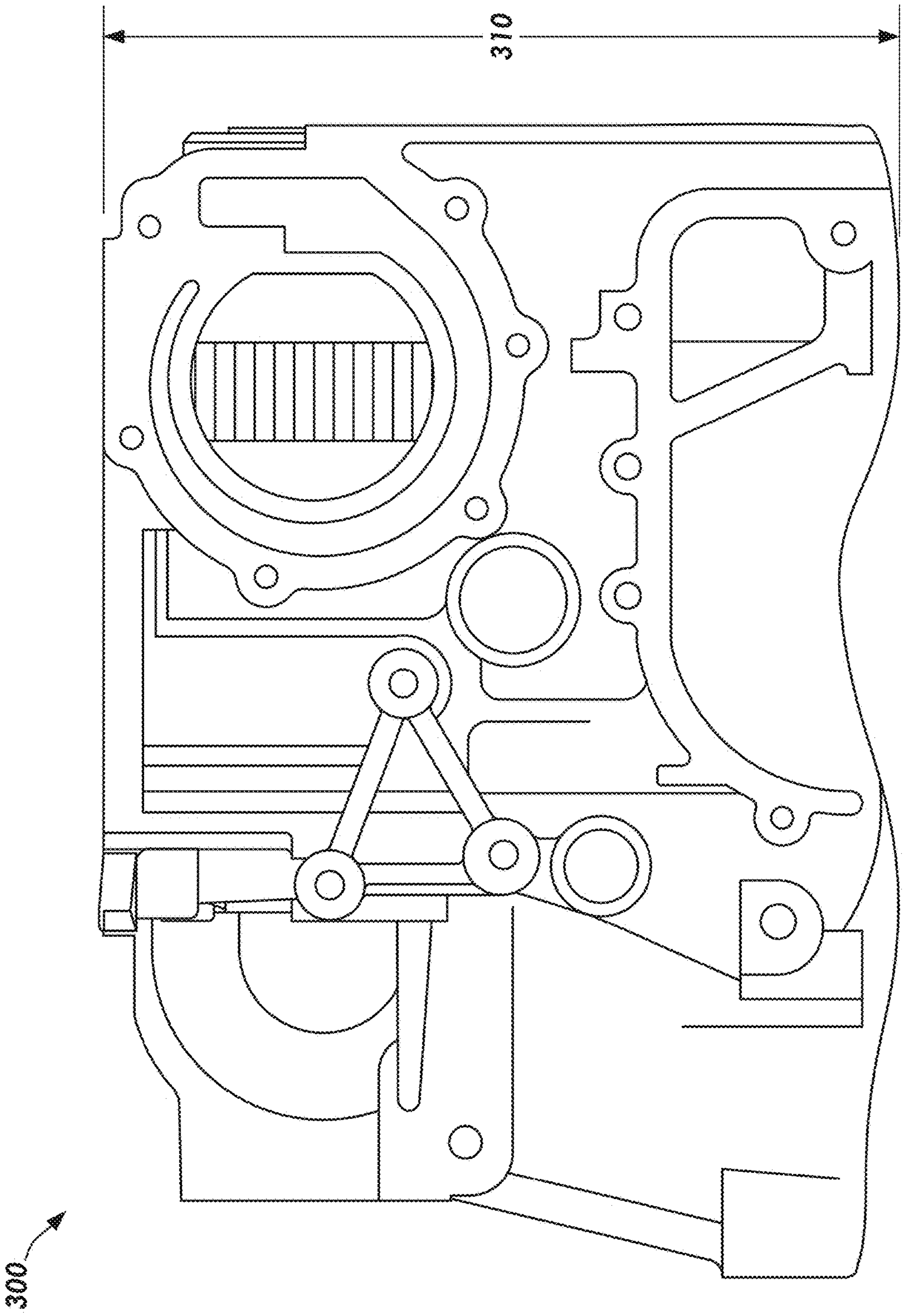
FIG. 3.2

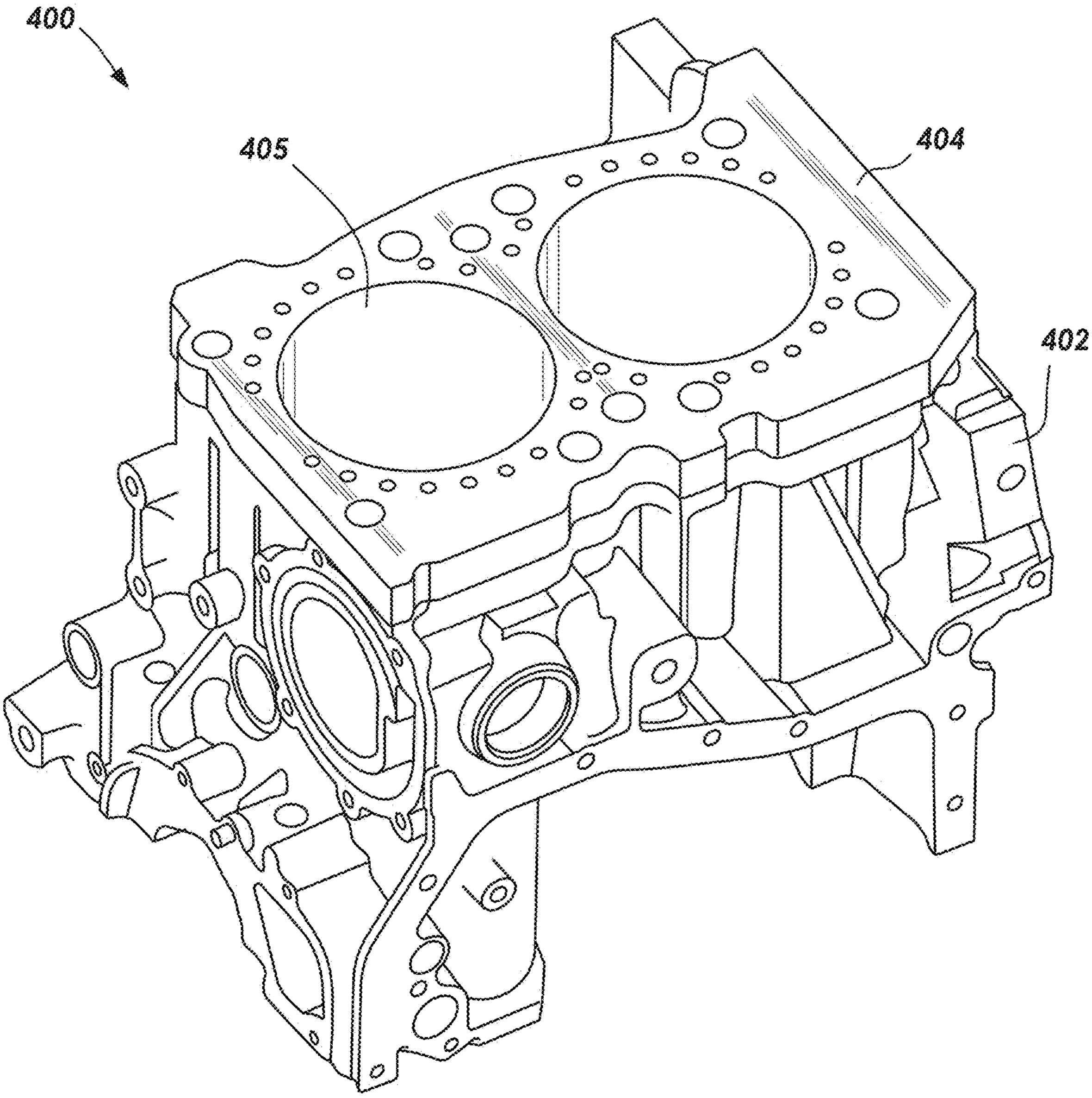
FIG. 4.1

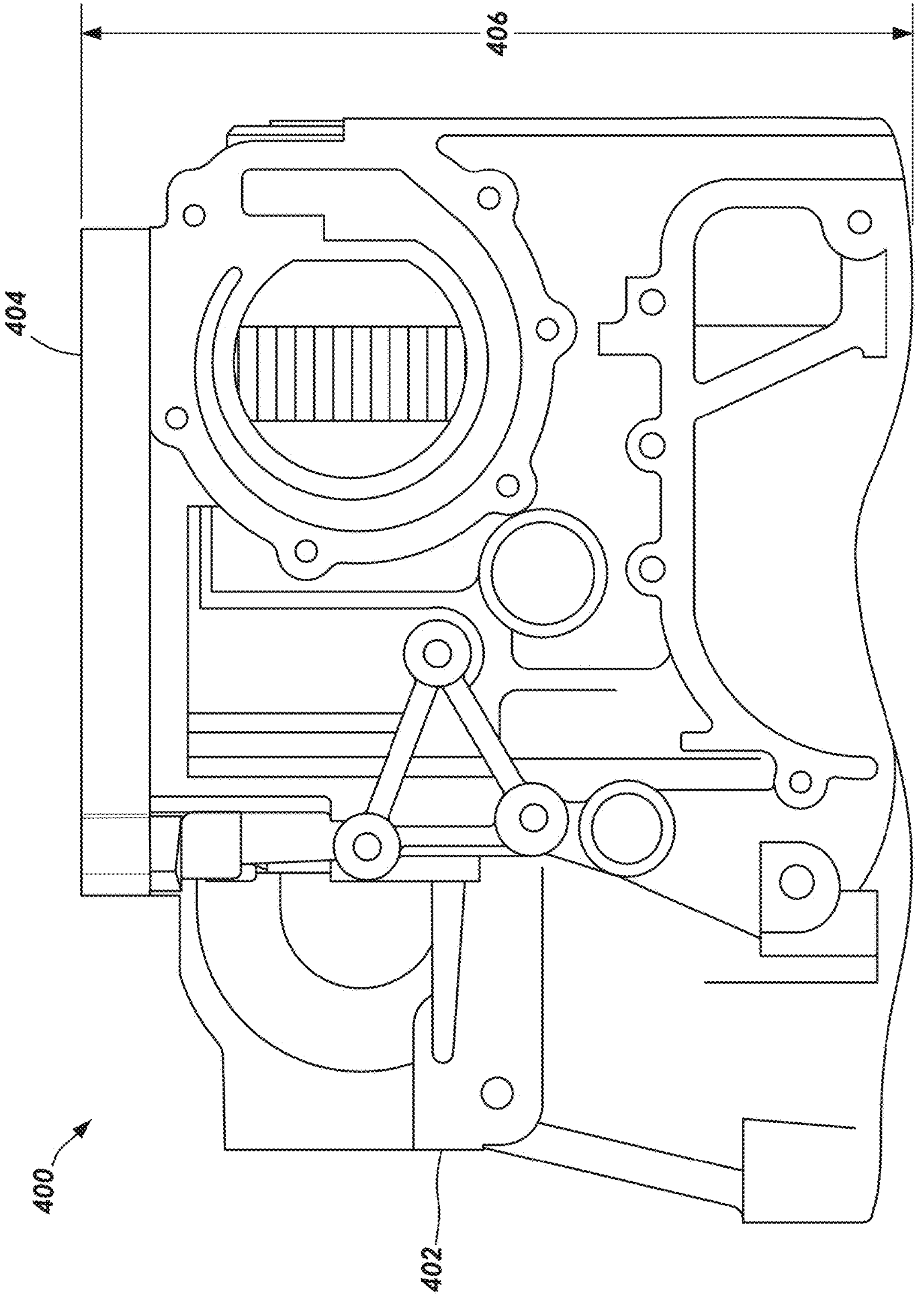
FIG. 4.2

ENGINE DECK EXTENDER

BACKGROUND

Internal combustion engines provided by manufacturers for the consumer are often modified to adjust the performance of the internal combustion engines. Users of such engines are constantly searching for improved ways to modify such engines to adjust the performance characteristics to suit other activities, such as racing.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

FIG. 3.1 is a perspective view of an unmodified engine block in accordance with one or more embodiments.

FIG. 3.2 is a side view of an unmodified engine block in accordance with one or more embodiments.

FIG. 4.1 is a perspective view of an extended engine block in accordance with one or more embodiments.

FIG. 4.2 is a side view of an extended engine block in accordance with one or more embodiments.

DETAILED DESCRIPTION

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

The following describes various embodiments disclosed herein.

Figure 1:
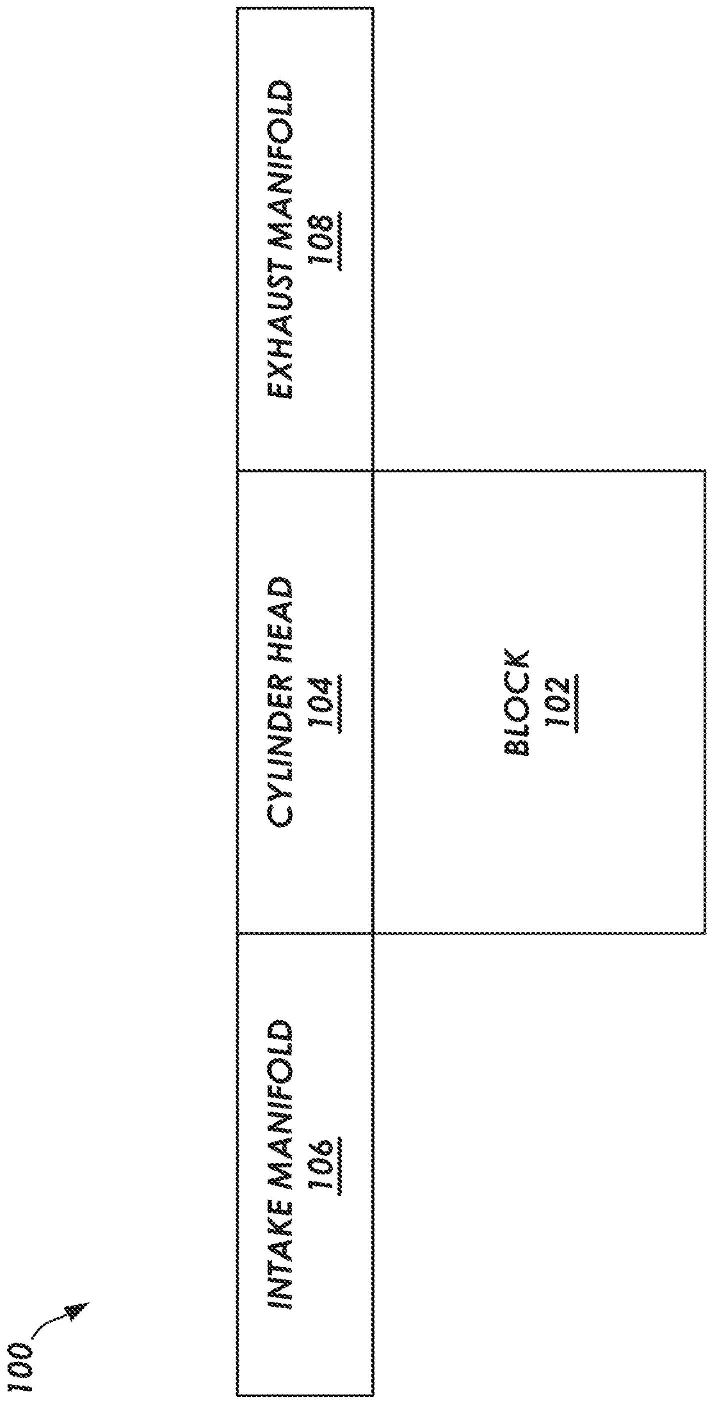
FIG. 1 is a schematic diagram of an engine according to one or more embodiments.

FIG. 1 is a schematic diagram of an internal combustion engine (100) which may be used within a vehicle (not shown). In one or more embodiments, the internal combustion engine (100) includes a block (102), a cylinder head (104), an intake manifold (106), and an exhaust manifold (108). The internal combustion engine (100) may include additional, fewer, and/or different components without departing from the scope of the embodiments disclosed herein. Each component illustrated in FIG. 1 is discussed below.

In one or more embodiments, the block (102) and the cylinder head (104) include all of the moving parts within the internal combustion engine (100) that provide the rotational force used to propel a vehicle. To that end, the block (102) includes cylinders, pistons, connecting rods, a crank chamber, wrist pins, and a crankshaft. In one or more embodiments, the block (102) may include any number of cylinders (e.g., 1, 2, 3, 4, 5, 6, 8, 10, 12, etc.) and corresponding pistons and connecting rods. Further, the cylinders may be disposed in any orientation without detracting from the embodiments disclosed herein. Each cylinder is a space defined in the block (102) and the total volume of the sum of the cylinders is known as the displacement of the internal combustion engine (100).

In one or more embodiments, the crank chamber is a space defined in the block (102) and is located below the cylinders to accommodate the crankshaft. Further, in one or more embodiments, the crankshaft is a rotating member that converts the linear motion of the pistons within the cylinders to a rotational motion, which is then used to propel a vehicle via any combination of intervening members, such as transmissions, transfer cases, differentials, wheels, etc. To provide the linear motion of the pistons, in the cylinders, an air-fuel mixture of intake air and fuel burns which causes the associated piston to be driven toward the crankshaft, thereby causing the crankshaft to rotate.

The internal combustion engine (100) includes the cylinder head (104) which includes ignition plugs, intake valves, fuel injection valves, exhaust valves, cam shafts, springs, and a head gasket. In one or more embodiments, multiple cylinder heads (104) are included, depending on the orientation and number of cylinders present in the block (102). In one or more embodiments, an ignition plug, an intake valve, a fuel injection valve, and an exhaust valve are included for each cylinder of the block (102). Further, in one or more embodiments, the head gasket is disposed at the interface between the cylinder head (104) and the cylinder block (102) to prevent leakage of fluids passing between the cylinder head (104) and the cylinder block (102).

In one or more embodiments, the intake valve and the fuel injection valve open and close to allow air and fuel to enter the cylinder. Then, the ignition plug is used in conjunction with movement of the piston to ignite the fuel-air mixture in the cylinder. Then, after combustion of the fuel-air mixture has completed, the exhaust valve opens to allow the combusted fuel-air mixture to exit the cylinder and pass to the exhaust manifold (108). This process is described in further detail below in FIG. 2.

In one or more embodiments, the intake manifold (106) is coupled to the cylinder head (104) and is used to provide air to the cylinders via the cylinder head (104). In one or more embodiments, the intake manifold (106) includes a central chamber that acts as a distribution hub, receiving air from a throttle body or turbocharger and distributing the air between the cylinders.

In one or more embodiments, the exhaust manifold (108) is coupled to the cylinder head (104) and is used to allow exhaust air (i.e., the combusted fuel-air mixture described above) to exit the cylinders via the cylinder head (104). In one or more embodiments, the exhaust manifold (108) includes a central chamber that acts as a receiving hub, receiving air from the various cylinders. In one or more embodiments, the exhaust manifold is sized and shaped to maintain a consistent exhaust air velocity and temperature throughout the exhaust manifold (108) despite the pulsed nature of exhaust gases in the internal combustion engine (100).

Figure 2:
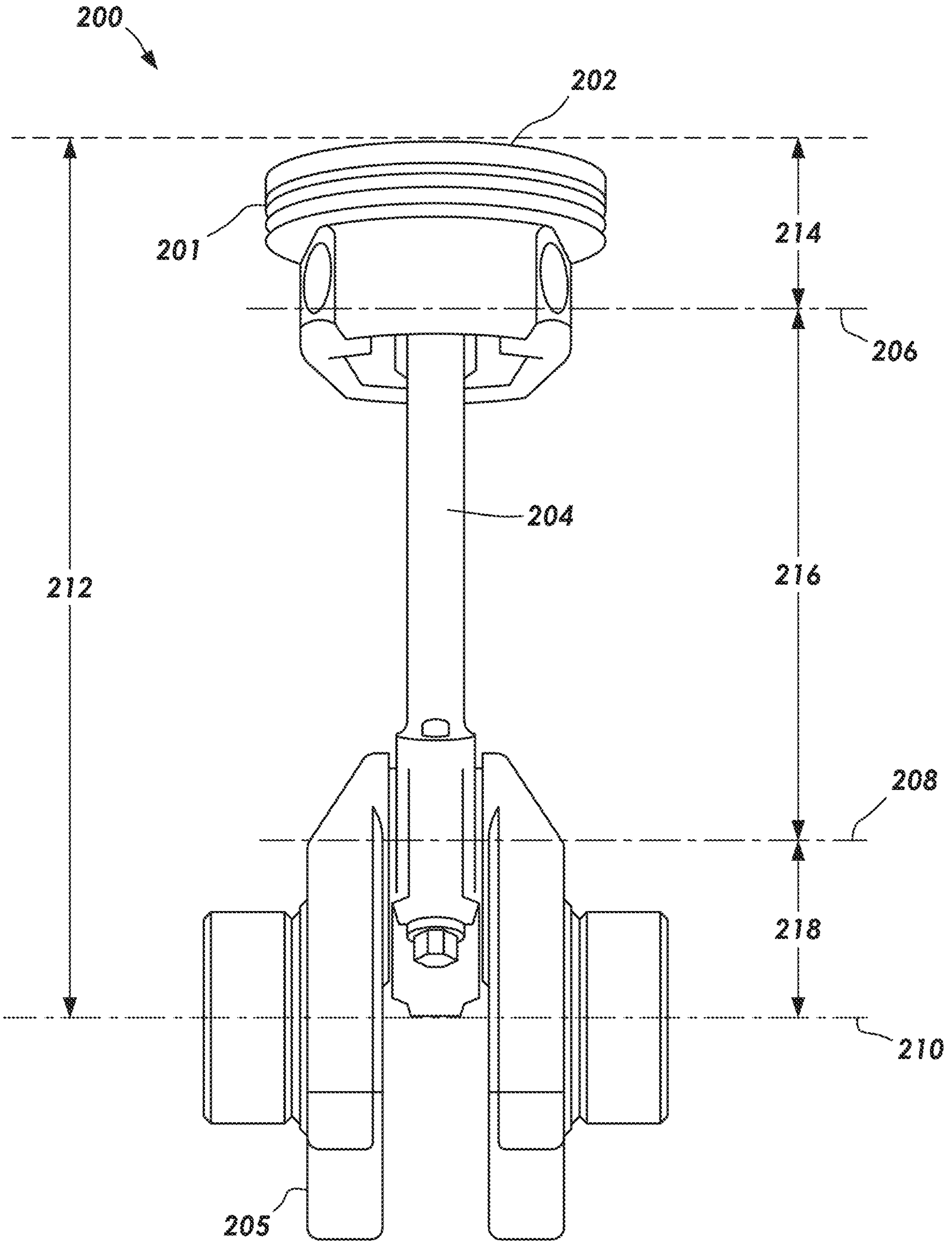
FIG. 2 is a schematic diagram of a rotating assembly in accordance with one or more embodiments.

Turning to FIG. 2, FIG. 2 illustrates a rotating assembly (200) which may be disposed within a cylinder of an engine (e.g., the internal combustion engine (100), FIG. 1). In one or more embodiments, the rotating assembly (200) includes a piston (201), a rod (204), a wrist pin (206), and a rod pin (208). The rotating assembly (200) may include additional, fewer, and/or different components without departing from the scope of the embodiments disclosed herein. Each component illustrated in FIG. 2 is discussed below.

In one or more embodiments, the piston (201) is a generally cylindrical component that is slightly smaller than the cylinder in which it is disposed and is configured to move up and down within the cylinder during the combustion cycle. In one or more embodiments, the piston (201) includes rings to seal the combustion chamber in the cylinder and to control the flow of oil to ensure smooth operation of the rotating assembly (200). Further, the piston (201) includes a top surface (202) at the interface between the combustion within the cylinder and the rotating assembly (200) and defines the topmost part of the piston (201). In one or more embodiments, the top surface (202) is composed of a different material than the rest of the rotating assembly (200) to accommodate the higher temperature and thermal cycling that it is exposed to when compared to the rest of the rotating assembly (200).

In one or more embodiments, the rod (204) is rotatably coupled to the piston (201) via the wrist pin (206). In one or more embodiments, the rod (204) is also rotatably coupled to a crankshaft (205) via the rod pin (208). The rod (204) is used to transfer the linear motion of the piston (201) and convert it to the rotating motion of the crankshaft (205), which rotates about a main bore centerline (210). As such, the rod (204) is commonly composed a very durable materials such as forged steel or aluminum alloys.

In one or more embodiments, the performance of an engine can be measured, in part, by the various measurements of the rotating assembly (200). For example, a piston compression height (214), which is the distance between the top surface (202) and a centerline of the wrist pin (206), is useful in determining the compression ratio of the engine, which is the ratio of the volume of the cylinder (i.e., the cylinder defined by the walls of the cylinder, the top surface (202), and the surface of the cylinder head) when the piston (201) is at its lowest point (i.e., bottom dead center (BDC)) to the volume of the cylinder when the piston is at its highest point (i.e., top dead center (TDC)).

Other useful measurements of the rotating assembly (200) include a rod length (216), which is the distance between the centerline of the wrist pin (206) and a centerline of the rod pin (208); a half stroke length (218), which is the distance between the centerline of the rod pin (208) and the main bore centerline (210); and an engine block deck height (212), which is the distance between the top surface (202) and the main bore centerline (210). Further, the half stroke length (218) is half of the vertical distance the centerline of the rod pin (208) travels between BDC and TDC.

In one or more embodiments, using the above measurements, certain features about the performance of the engine can be better understood. For example, the ratio between the rod length (216) and the stroke length (i.e., double the half stroke length (218)) is widely used to predict how stable the engine will be at higher revolutions per minute (RPM) ranges. Further, the rod to stroke ratio and stability at higher RPM ranges are proportionally related (i.e., a higher stroke ratio indicates greater stability at higher RPM ranges). For example, typical consumer engines utilize a rod to stroke ratio in the range of about 1.6 to about 1.7. Conversely, racing engines, which are typically constructed to be more stable at higher RPM ranges, have rod to stroke ratio of about 1.8 to about 2.2. Further, as used herein, higher RPM ranges generally refer to RPMs greater than 6000, 7000, 7500, or 8000. In addition, the higher stability is often accompanied by a reduction in side loading (i.e., loads applied to the piston (201) that are not aligned with a central axis of the cylinder, thereby causing the piston (201) to be biased toward a sidewall of the cylinder).

Turning to engine performance metrics, the output power of an engine (i.e., the horsepower) is defined as the RPM multiplied by the torque and divided by a constant, 5252. Thus, to increase the power, one must increase the maximum torque produced or increase the RPM at which peak torque is achieved. Further, torque is directly proportional to the pressure in the cylinder caused by the combustion, the number of pistons and the stroke length. Further, the RPM of an engine is limited by the physical characteristics of the engine and running an engine at a higher RPM typically decreases the longevity of the engine. As such, engine designers limit the maximum RPM that the engine is allowed to run to balance performance and longevity.

As such, increasing the rod to stroke ratio is seen as desirable for increasing the performance of the engine as it allows for an engine to be more safely operated at higher RPMs. Further, looking at the above determination of rod to stroke ratio, engine designers are limited in their ability to adjust the rod to stroke ratio by the engine block deck height (212) and the half stroke length (218). Typically, to increase the rod to stroke ratio, an engine designer can either decrease the half stroke length (218) by increasing the rod length (216) or by moving the wrist pin (206) closer to the top surface (202). However, each of these options can create potential weaknesses that may decrease the longevity of the engine and/or reduce other performance characteristics of an engine. For example, reducing the half stroke length reduces the total displacement of the engine, and therefore also reduces the peak torque. In another example, moving the wrist pin (206) closer to the top surface (202) can increase the rod length (216), but may reduce the reliability and/or strength of one or more of the ring lands on the piston, such as a tertiary ring land.

In addition, many engine designers start with an already constructed engine, typically from a mass manufacturer of engines. As such, the options to further modify the engine are limited by the current design of the engine. One other option that engine designers take to increase engine performance is to machine the engine block around the cylinder to increase the cylinder size, thus increasing the total displacement of the engine block. However, this option has become less favorable with modern engines that more efficiently utilize all of the space in the engine block for functional purposes (e.g., oil flows, coolant flows, connection points, etc.).

As will be seen below, the embodiments disclosed herein overcome these limitations by increasing the space between the engine block and the cylinder head, thereby providing a greater engine block deck height (212). In turn, all of the above-described lengths may be increased while also increasing the rod to stroke ratio. Thus, the embodiments described herein can increase engine power, torque, and maximum RPM ranges (via greater stability). The embodiments described herein increase the displacement of the cylinders by 5 to 25 percent, 10 to 20 percent, 12 to 15 percent, or any other range between 5 and 25 percent. The embodiments described herein may also increase the rod to stroke ratio by 5 to 20 percent, 10 to 15 percent, 8 to 12 percent, or any other range between 5 and 20 percent.

Turning to FIGS. 3.1 and 3.2, FIG. 3.1 shows a perspective view of an unmodified engine block (300), and FIG. 3.2 shows a side view of the unmodified engine block (300), in accordance with one or more embodiments. In one or more embodiments, the unmodified engine block (300) includes two cylinders (302), head bolt passages (304), and fluid passages (306). The unmodified engine block (300) may include additional, fewer, and/or different components without departing from the scope of the embodiments disclosed herein. Each component illustrated in FIGS. 3.1 and 3.2 is discussed below.

In one or more embodiments, the cylinders (302) have been discussed above and provide a cavity in which a piston (e.g., rotating assembly (200)) may be positioned. Further, in one or more embodiments, the head bolt passages (304) are conduits which may be threaded at one end and are configured to receive head bolts to couple a cylinder head to the unmodified engine block (300). In addition, in one or more embodiments, the passages (306) are used for various fluid flows through the unmodified engine block (300), such as oil and coolant.

Further, as can be seen in FIG. 3.2, the unmodified engine block (300) has a block height (310) that is one of the primary constraints when attempting to modify the unmodified engine block (300) to improve its potential performance.

In one or more embodiments, the unmodified engine block (300) is manufactured by a major manufacturer and is intended to be used in a vehicle intended for consumers. As such, the design of the unmodified engine block (300) may be intended to sacrifice certain performance characteristics to increase the longevity of the unmodified engine block (300) or to maximize its performance under circumstances more often encountered on normal road driving conditions rather than racing conditions.

Turning to FIGS. 4.1 and 4.2, FIG. 4.1 shows a perspective view of an extended engine block (400), in accordance with one or more embodiments. In one or more embodiments, the extended engine block (400) includes a modified engine block (402) and a deck extender (404). The extended engine block (400) may include additional, fewer, and/or different components without departing from the scope of the embodiments disclosed herein. Each component illustrated in FIGS. 4.1 and 4.2 is discussed below.

In one or more embodiments, the modified engine block (402) is largely the same as the unmodified engine block (300) discussed above. In one or more embodiments, the modifications to the modified engine block (402) include a groove machined into a top surface of the modified engine block (402) to mate with the deck extender (404). In one or more embodiments, the groove machined into the modified engine block (402) is sized to fit a corresponding shape in the deck extender (404). As such, the dimensions of the groove in the modified engine block (402) are slightly smaller than the dimensions of the relevant portion of the deck extender (404) and may be sized to allow a press fit between the deck extender (404) and the modified engine block (402). In one or more embodiments, a press fit includes a size difference of about one thousandth of an inch, one half of one thousandth of an inch, or any measurement between one half of one thousandth of an inch and two thousandths of an inch. In one or more embodiments, a coupling between the modified engine block (402) and the deck extender (404) can include adhesives, welding, etc.

In one or more embodiments, the wall of the cylinder of the modified engine block (402) is also machined to allow a cylinder sleeve (405) to be inserted into the cylinder. In one or more embodiments, the cylinder sleeve (405) is included to provide a continuous interior surface of the cylinder and may be composed of different materials that are better suited for the temperatures, pressures, and thermal cycles experienced within the cylinder.

In one or more embodiments, the deck extender (404) is coupled to the modified engine block (402) to thereby increase an engine block height (410) of the extended engine block (400) when compared to the unmodified engine block (300). As shown in greater detail in FIG. 5, the deck extender (404) is configured to seamlessly mate with the unmodified engine block (402) and includes cylinder passages (420), head bolt passages (422), and fluid passages (424), each of which are positioned and sized to match the corresponding openings on the modified engine block (402). Further, in one or more embodiments, a top surface of the deck extender may substantially match the original top surface of the unmodified engine block (300), such that the process for coupling the cylinder head to the deck extender remains unchanged from the process of coupling the cylinder head to the unmodified engine block (300). As such, when the deck extender (404) is coupled to the modified engine block (402), the only additional changes that need to be made are to accommodate the larger space in the cylinders and the additional power and torque produced by the extended engine block (400).

In one or more embodiments, the inclusion of the deck extender (404) enables a longer rod and piston to be utilized, and such rod and piston may be composed of a higher strength material to accommodate the additional power produced by the extended engine block (400). For example, if the stock, unmodified engine (300) utilized cast aluminum pistons and steel (i.e., cast or otherwise) rods, the extended engine block (400) may use forged aluminum pistons and forged steel rods. Further, the additional displacement may be able to intake air and produce exhaust at a higher rate, which may also necessitate increasing the size of the intake and exhaust manifolds. In one or more embodiments, certain engines are not naturally balanced and use counterweights on a crankshaft to maintain the balance of the engine. With the addition of the deck extender (404), such engines that are not naturally balanced may also require the counterweights to be adjusted (e.g., made heavier, positioned further from an axis of rotation, etc.) to maintain balance. In one or more embodiments, the inclusion of the deck extender (404) may necessitate further changes to the vehicle, including changing fuel injectors, coolant components, oil flow components, etc. Moreover, in one or more embodiments, the deck extender (404) may be sized such that replacement rods and pistons that are usable in the extended engine block (400) can be sourced from other generally available engines. For example, including the deck extender (404) in a Subaru EJ series engine may enable the use of components (e.g., pistons, rods, etc.) from a Chevrolet LS series engine, thereby greatly increasing the predictability of the qualities of the replacement components.

Figure 6:
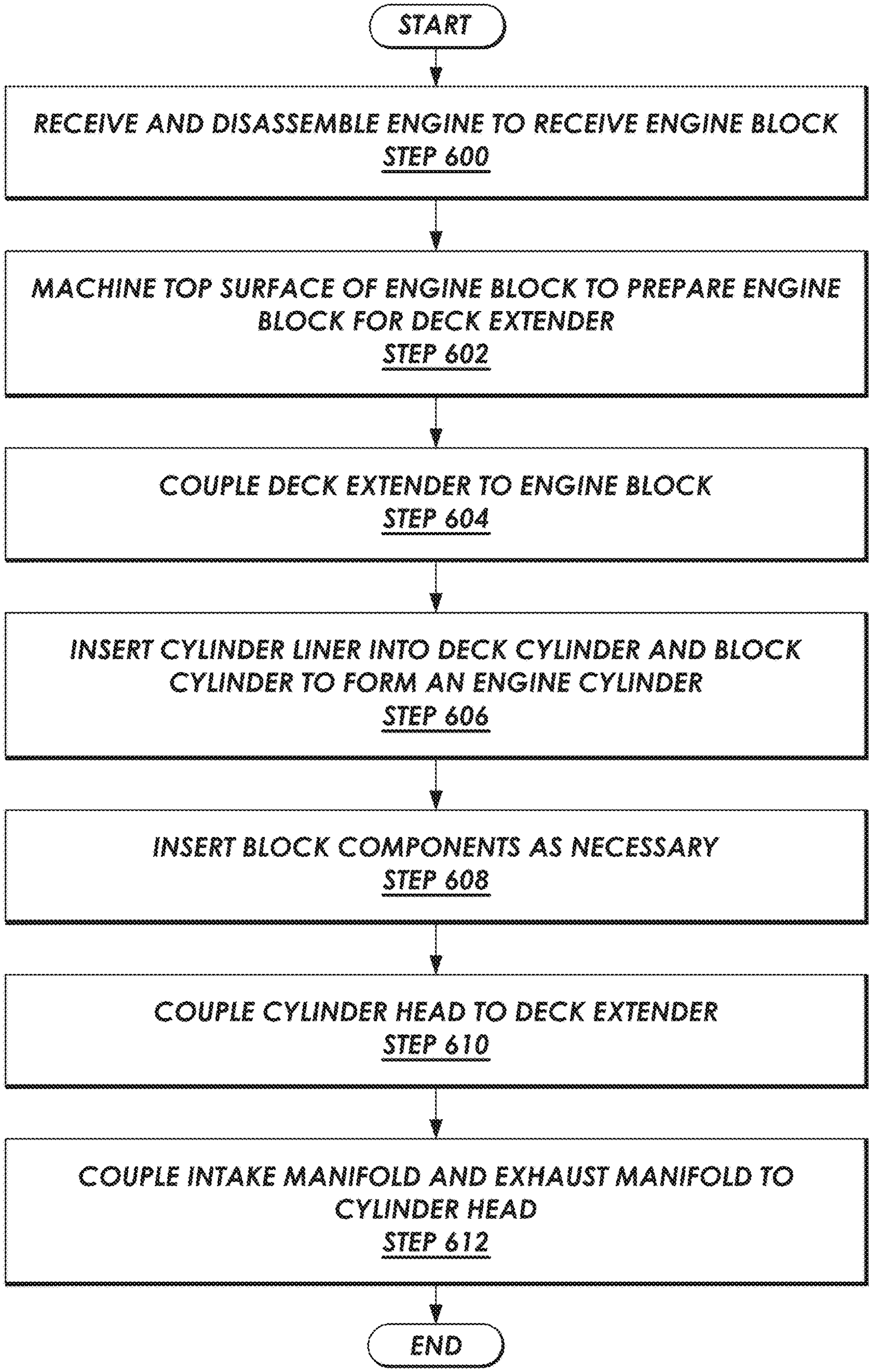
FIG. 6 shows a method for assembling an engine block and a deck extender in accordance with one or more embodiments.

Turning now to FIG. 6, FIG. 6 shows a method for receiving a commercially available engine, modifying the engine block, and coupling the deck extender to the modified engine block. While various steps in the method are presented and described sequentially, those skilled in the art will appreciate that some or all of the steps may be executed in different orders, may be combined or omitted, and some or all steps may be executed in parallel without departing from the scope of the embodiments disclosed herein. The method of FIG. 6 may be performed by one or more operators (e.g., technicians, machinists, designers, etc.) without departing from the scope of the embodiments disclosed herein.

In step 600, an operator receives and disassembles an engine (e.g., the internal combustion engine (100), FIG. 1) to receive an unmodified engine block (e.g., unmodified engine block (300), FIG. 3.1). In one or more embodiments, the unmodified engine block may be received directly after its manufacture and before it is connected to any other components, which would allow step 600 to be skipped. Further, while the order of operations and exact components that need to be removed varies greatly depending on the specific engine, the disassembly of the engine generally requires the removal of the intake manifold, the exhaust manifold, and the cylinder head and then further disconnecting the engine from other drivetrain components. In addition, disassembling the engine further includes removal of components that are positioned within the engine, such as the crankshaft, pistons, etc.

Figure 5:
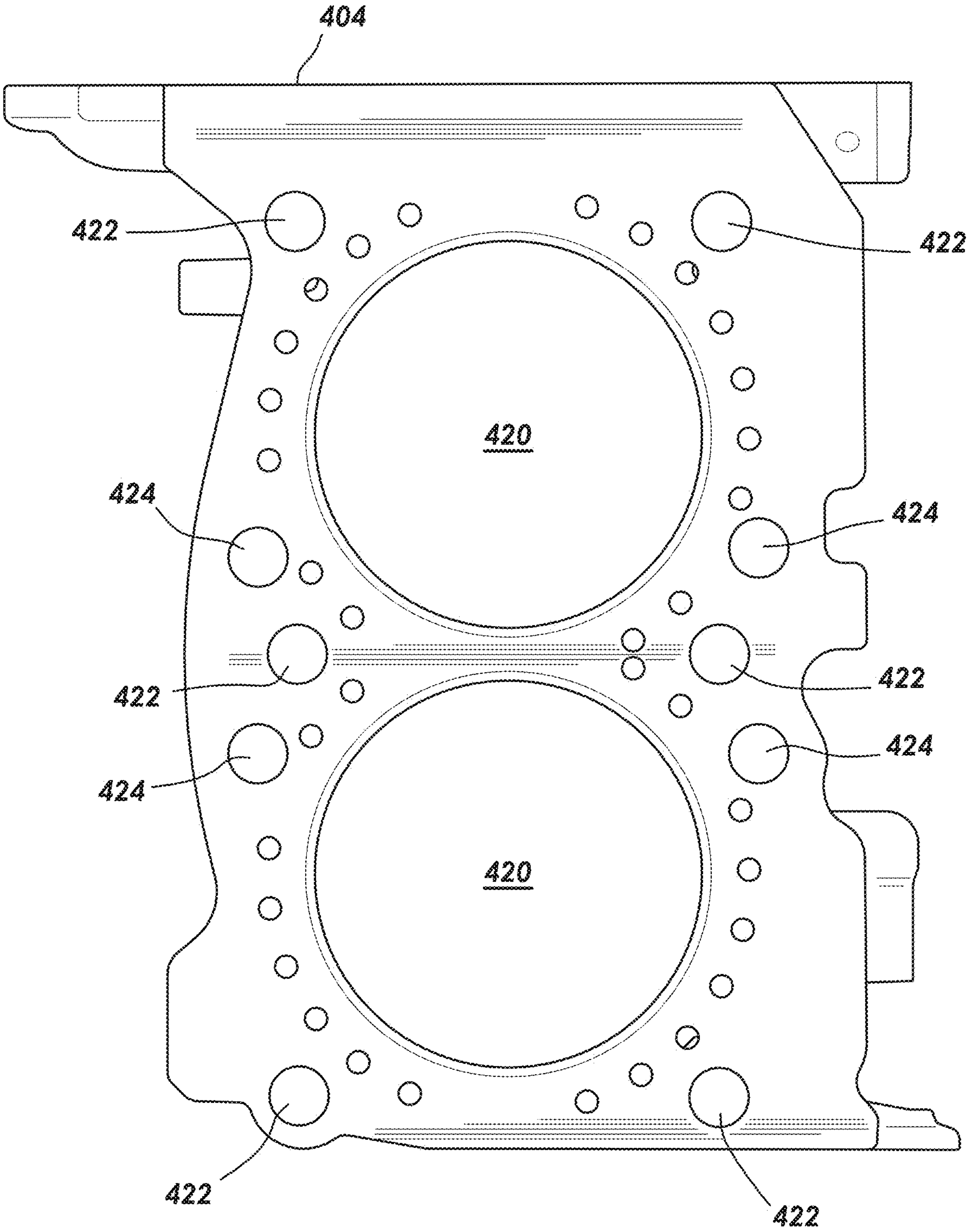
FIG. 5 is a top view of a deck extender in accordance with one or more embodiments.

In step 602, after the engine block has been fully disassembled, the engine block is modified to prepare the engine block to receive a deck extender (e.g., deck extender (404), FIG. 5). In one or more embodiments, this step includes machining a groove into a top surface of the engine block and/or machining a portion of the cylinder, as described above to receive a modified engine block (e.g., modified engine block (402), FIG. 4.1). Then, in step 604, the deck extender is coupled to the engine block, as described above to receive an extended engine block.

In step 606, a cylinder liner (e.g., cylinder liner (405), FIG. 4.1) is inserted into the deck cylinder passage and the block cylinder to form an engine cylinder. In doing so, the cylinder liner forms a continuous passage to fully contain the combustion chamber as if the engine block and deck extender were an integral part.

Then, steps 608 through 610 provide for the re-assembly of the extended engine block. In particular, in step 608, the components positioned within the extended engine block are inserted, which, as described above, may not be the same components as those that were removed in step 600. In one or more embodiments, these components include the crankshaft, piston assemblies, etc.

In step 610, the cylinder head is coupled to the deck extender. In one or more embodiments, this process is unchanged from a process of coupling the cylinder head to an unmodified engine block. While every engine is unique in its process, coupling cylinder heads to engine blocks, and, by extension, deck extenders, includes placing a head gasket on the deck extender, then placing the cylinder head onto the deck extender, and then fitting head bolts through the head bold passages and tightening them in accordance with the manufacturer's specifications. Further, in one or more embodiments, certain standard components may be replaced by other readily available components to accommodate the changed geometry and/or higher performance characteristics of the modified engine. For example, higher strength and/or larger head bolts may be used in place of the standard head bolts. Further, additional or alternate methods of sealing the deck extender to the head gasket may be used such as O-rings, fire ring, liquid sealants, or any other known method of sealing and/or coupling cylinder heads to engine blocks.

In step 612, the intake manifold and the exhaust manifold are coupled to the cylinder head. As described above, the intake manifold and exhaust manifold may also be modified to accommodate larger air flows. For example, the intake manifold may be machined to accommodate the change in the distance to the intake of the cylinder because of the deck extender. It should be appreciated that such additional modifications are unique to the engine and the desired performance characteristics of the engine. However, even if the intake manifold and/or the exhaust manifold are modified, the reassembly of the intake manifold and exhaust manifold would remain unchanged. Generally, after step 612, the engine is now ready to be placed back into a vehicle and coupled with the other components of the vehicle. However, it should be appreciated that every vehicle is different and the exact order of reassembly or components that are needed may vary. In one or more embodiments, after completion of step 612, the engine that now includes the deck extender may further require additional programming to account for the changed characteristics of the engine, which may include adjusting timing, fuel flow rates, oil flow rates, coolant flow rates, fuel types, etc.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. An engine comprising:

a block comprising a block cylinder, a block passage configured to receive a head bolt, and a block fluid passage;

a deck extender coupled to the block, wherein the deck extender comprises a deck cylinder configured to align with the block cylinder, a deck passage configured to align with the block passage, and a deck fluid passage configured to align with the block fluid passage;

a cylinder liner coupled to the block and the deck extender via the block cylinder and the deck cylinder, wherein the cylinder liner comprises a contiguous cylinder wall to form an engine cylinder; and a cylinder head configured to couple to the deck extender.

2. The engine of claim 1, wherein the block comprises a groove machined into a top surface of the block and wherein the deck extender is configured to couple to the block via the groove.

3. The engine of claim 2, wherein the coupling between the groove and the deck extender is a press fit.

4. The engine of claim 1, wherein a combined volume of the block cylinder and the deck cylinder is between 10 percent and 15 percent greater than a volume of the block cylinder alone.

5. The engine of claim 1, wherein the coupling of the block and the deck extender enables a 10 percent to 15 percent greater rod-to-stroke ratio than the block alone.

6. The engine of claim 1, further comprising a head gasket, an O-ring, or a fire ring coupled between the deck extender and the cylinder head.

7. The engine of claim 6, further comprising a forged rod and piston configured to operate within the cylinder liner.

8. The engine of claim 6, further comprising:

an intake manifold coupled to the cylinder head, wherein the intake manifold is configured to provide an intake airflow to the engine cylinder; and an exhaust manifold coupled to the cylinder head, wherein the exhaust manifold is configured to receive an exhaust airflow from the engine cylinder.

9. A method for increasing a displacement of an engine, the method comprising:

coupling a deck extender to a block of the engine, wherein the deck extender comprises a deck cylinder configured to align with a block cylinder of the block, a deck passage configured to align with a block passage of the block, and a deck fluid passage configured to align with a block fluid passage of the block;

inserting a cylinder liner through the deck cylinder and the block cylinder to form an engine cylinder, wherein the cylinder liner comprises a contiguous wall; and coupling a cylinder head to the deck extender via a plurality of head bolts extending through the deck extender and into the block.

10. The method of claim 9, further comprising:

prior to coupling the deck extender to the block: machining a groove into a top surface of the block, and wherein coupling the deck extender to the block comprises coupling the deck extender to the block via the groove.

11. The method of claim 10, wherein the coupling between the groove and the deck extender is a press fit.

12. The method of claim 9, wherein coupling the deck extender to the block causes a combined volume of the block cylinder and the deck cylinder to be between 10 percent and 15 percent greater than a volume of the block cylinder alone.

13. The method of claim 9, wherein coupling the deck extender to the block enables a 10 percent to 15 percent greater rod-to-stroke ratio than the block alone.

14. The method of claim 9, further comprising inserting a head gasket between the deck extender and the cylinder head.

15. The method of claim 14, further comprising inserting a forged rod and piston within the engine cylinder.

16. The method of claim 14, further comprising:

coupling an intake manifold coupled to the cylinder head, wherein the intake manifold is configured to provide an intake airflow to the engine cylinder; and coupling an exhaust manifold coupled to the cylinder head, wherein the exhaust manifold is configured to receive an exhaust airflow from the engine cylinder.

17. A device for increasing a displacement of an engine, the device comprising:

a deck extender coupled to a block of the engine, wherein the deck extender comprises a deck cylinder configured to align with a block cylinder of the block, a deck passage configured to align with a block passage of the block, and a deck fluid passage configured to align with a block fluid passage of the block, and wherein the deck cylinder is configured to receive a cylinder liner that comprises a contiguous cylinder wall to form an engine cylinder.

18. The device of claim 17, wherein a volume of the engine cylinder is between 10 percent and 15 percent greater than a volume of the block cylinder alone.

19. The device of claim 17, wherein the coupling of the block and the deck extender enables a 10 percent to 15 percent greater rod-to-stroke ratio than the block alone.

20. The device of claim 17, wherein the deck extender is configured to receive a head gasket configured to fit the block.

* * * * *